S. KAHN.
COMBINED BLOW-OFF AND HOSE CONNECTION FOR TIRES.
APPLICATION FILED AUG. 3, 1918.
1,299,398.
Patented Apr. 1, 1919.
3 SHEETS—SHEET 1.
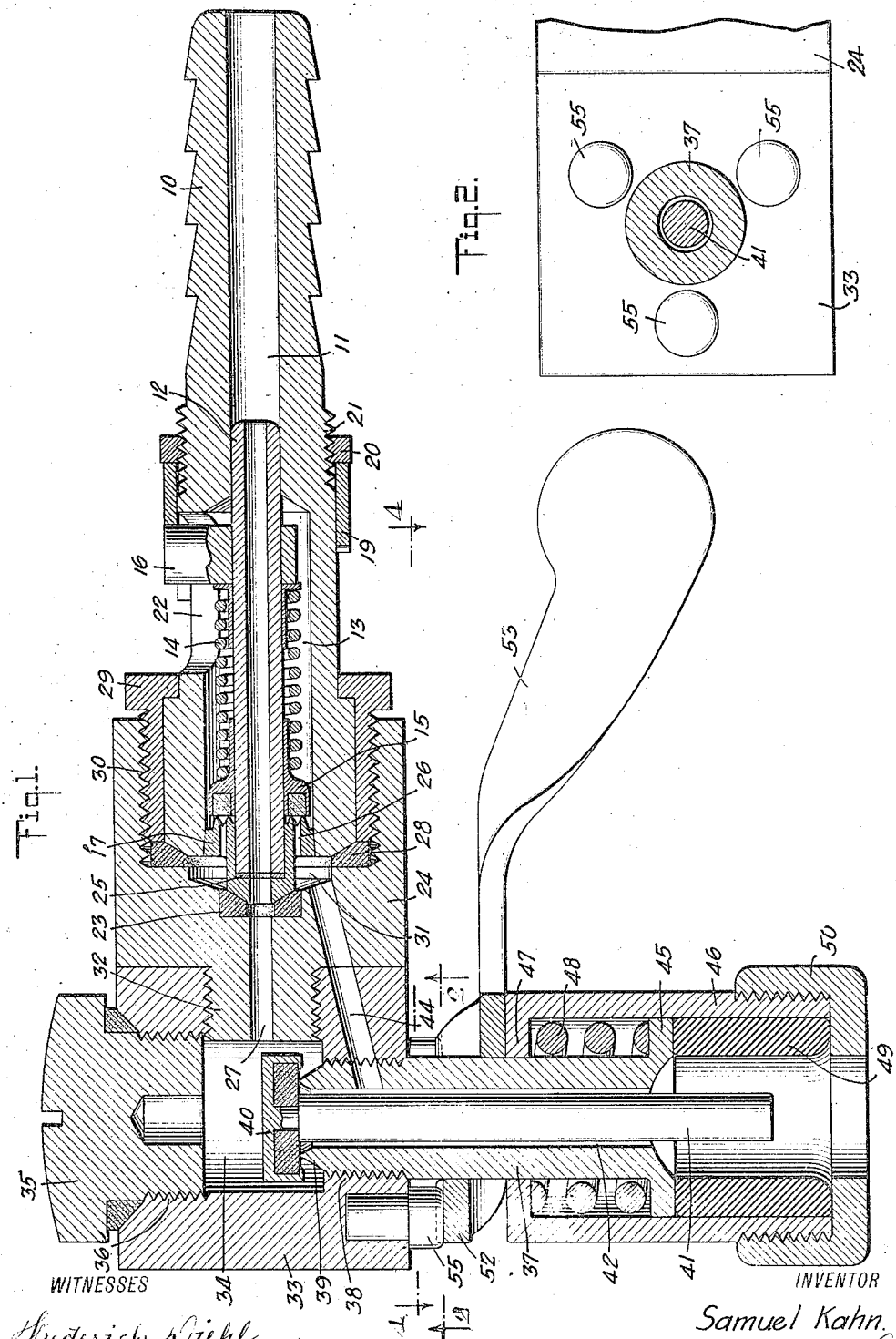

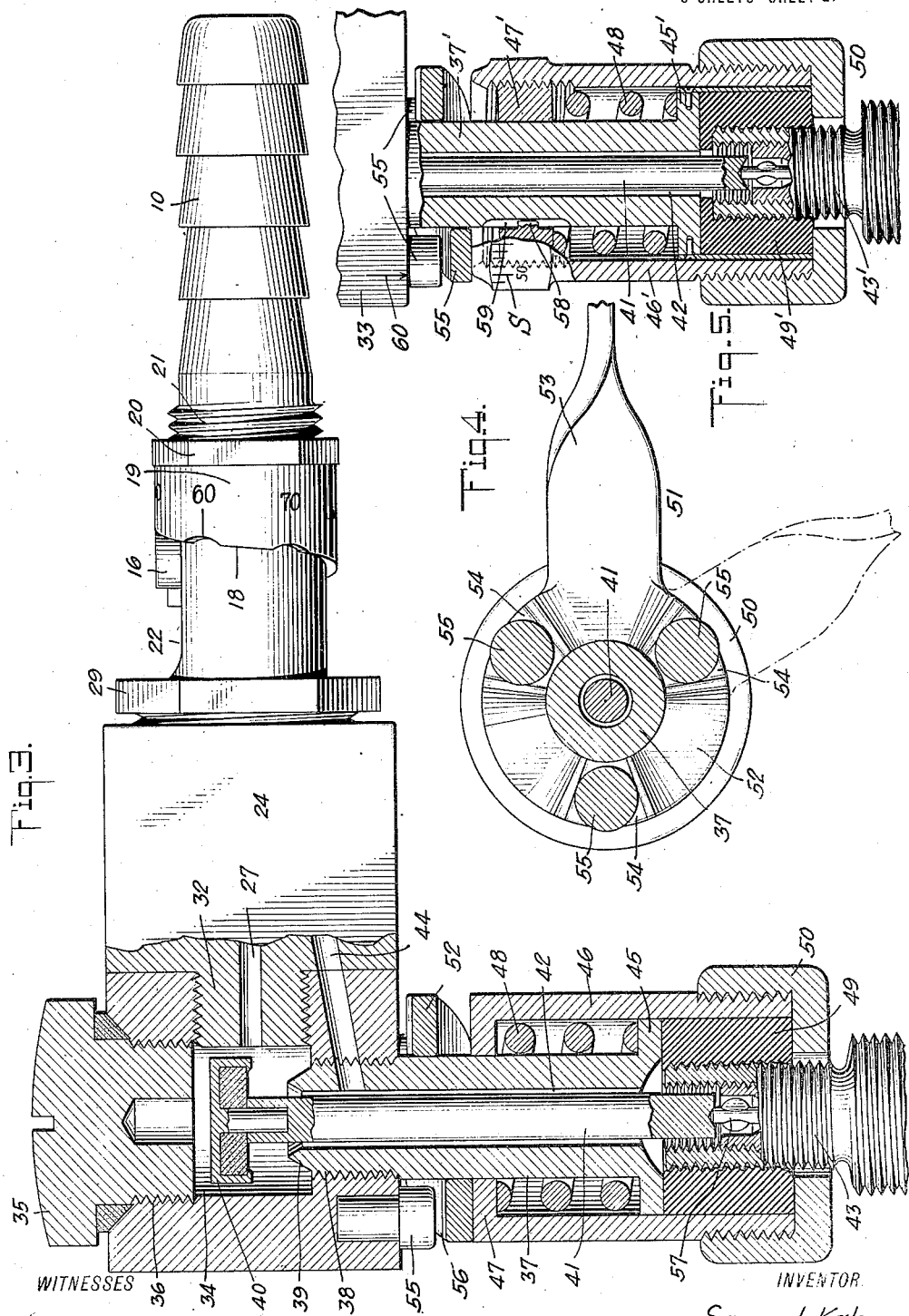

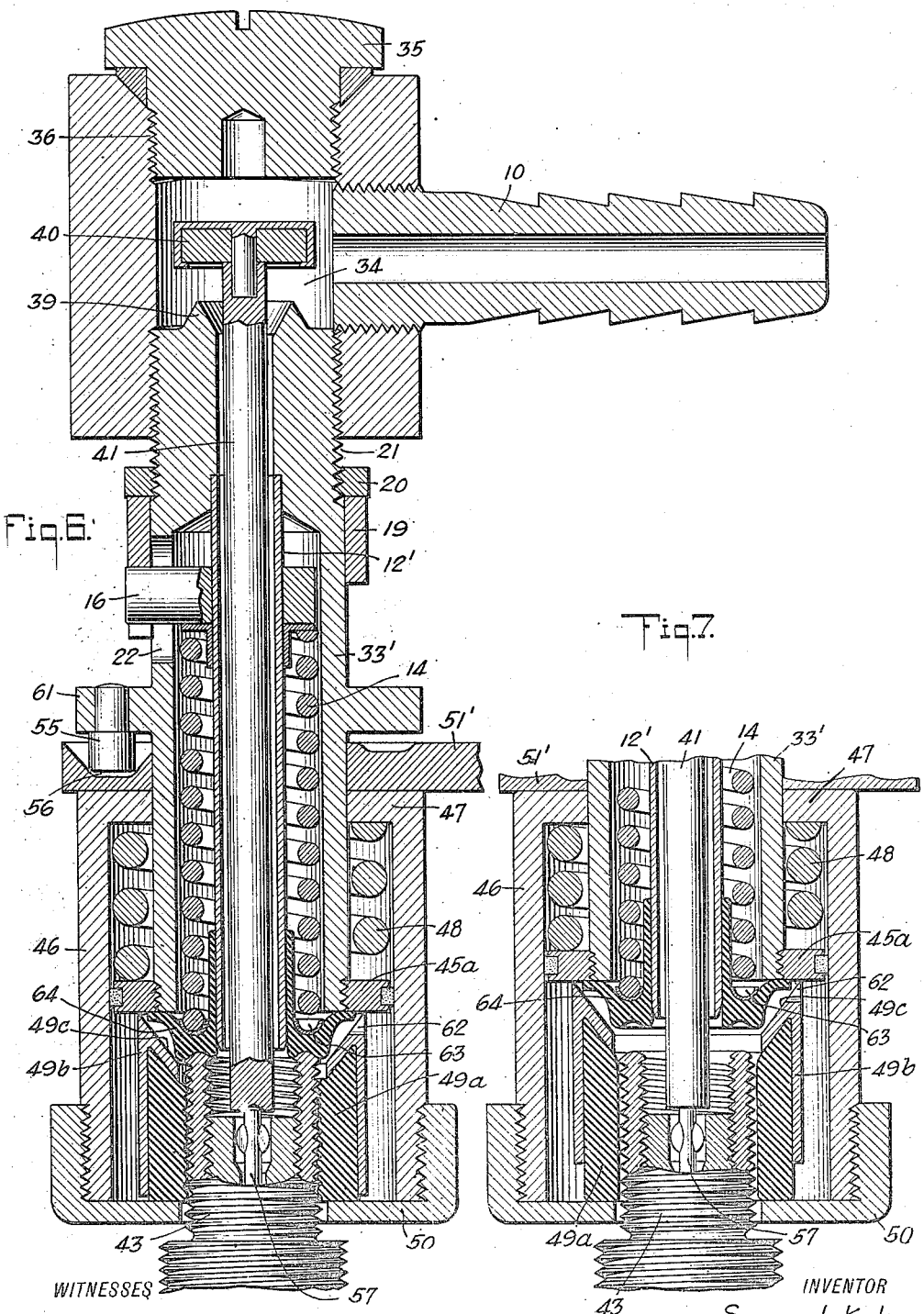

UNITED STATES PATENT OFFICE.

SAMUEL KAHN, OF NEWARK, NEW JERSEY.

COMBINED BLOW-OFF AND HOSE CONNECTION FOR TIRES.

1,299,398.

Specification of Letters Patent.

Patented Apr. 1, 1919.

Application filed August 3, 1918. Serial No. 248,122.

*To all whom it may concern:*

Be it known that I, SAMUEL KAHN, a citizen of the United States, and a resident of Newark, in the county of Essex and State of New Jersey, have invented a new and Improved Combined Blow-Off and Hose Connection for Tires, of which the following is a full, clear, and exact description.

This invention relates to pneumatic tire apparatus and has special reference to automatic blow-offs as adapted particularly for permanent connection with tubes leading from compressed air tanks or pumps for application to tires in garages or analogous places.

Among the objects of the invention, therefore, is to provide a combined blow-off and hose connection of suitable design for permanent attachment to a flexible hose connected to a compressed air reservoir or other source from which compressed air may be delivered into pneumatic tires or other containers.

Another object of the invention is to provide a combined attachment including an automatic blow-off or releasing valve adapted to become effective at a predetermined relatively low pressure, means being provided to attach the device to a source of compressed air under relatively higher pressure, and the device having also means normally preventing the force of the higher pressure from prematurely operating the automatic air releasing device.

Another object of the invention is to improve the facilities for making an easy connection between the combined attachment and a tire nipple.

A still further object of the invention is to provide a compressed air hose connection for a pneumatic tire or other container to be charged with air or gas at a predetermined degree of compression, said connection being of such a nature as to blow off or be automatically disconnected from the container when the desired degree of pressure is attained in the tire or other container.

Again, an object is to provide a connection between a pneumatic tire or other receptacle to be charged and a source of air or gas pressure, of such a nature that when the connection is automatically disconnected from the receiver at a predetermined pressure therein the connection automatically adapts itself to prevent leakage at any pressure from the source of supply, such leak preventing means, therefore, being automatically opened when the connection is applied to the receiver.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section of one form of my improved device, the parts being in the position that they are caused to assume preparatory to attachment of the device to the tire or receiver.

Fig. 2 is a horizontal section on the line 2—2 of Fig. 1.

Fig. 3 is a view similar in part to Fig. 1, but showing the change of position of certain of the parts incident to the attachment thereof to the tire nipple.

Fig. 4 is a horizontal sectional detail on the line 4—4 of Fig. 1.

Fig. 5 is a longitudinal sectional detail of a modified form of the invention.

Fig. 6 is a central sectional view of a further modification, parts being clutched to the tire nipple as in Fig. 3; and Fig. 7 is a view similar to the lower portion of Fig. 6, but with the clutch released ready for the connection to blow off of the tire nipple.

In the best automobile practice it is desirable if not essential for the tires to be charged and kept charged at a substantially uniform pressure the degree of which may be determined by the character or quality of the tires, the load to be carried, or the weather or other conditions. In other words it is dangerous or injurious to the tires for them to be either over-charged or under-charged. The demand, therefore, at present is for a device or an attachment through the use of which a pneumatic tire may be charged at a predetermined degree directly from a pump or other source of air pressure without any care or attention on the part of any one beyond the determination of the pressure desired. While I may refer more or less specifically in this description to the inflation of automobile tires I wish it to be understood that my improvement is adapted for a much wider range of usefulness, and therefore I do not wish to be limited in the interpretation of the claims to any specific art.

Referring now more specifically to the drawings, I show at 10 a corrugated nipple suitable for attachment to a flexible hose or the like, not shown, but which will be understood as leading from a pump or a source of compressed air of any well known nature. In the bore 11 of this nipple is fitted a quill 12 surrounding which and in an enlargement 13 formed in the opposite end of the nipple structure is a coil spring 14 of known or determinable strength. One end of the spring bears against a blow-off valve 15 while the other end of the spring bears against a pin 16. The valve 15 and pin 16 are both slidable upon the quill, the former being held normally against the blow-off valve seat 17 and the latter being held by virtue of the spring against the spiral edge 18 of a graduated collar 19 adapted to be moved circumferentially around the body of the nipple to determine the degree of internal pressure that would be necessary to unseat the blow-off valve. The circular edge of the collar 19 bears against a lock nut 20, the adjustment of which along the threaded portion 21 of the nipple serves to establish the accuracy and reliability of the graduation marks on the collar. The adjustment of this lock nut is usually performed in the factory and is made permanent by any suitable means so as to prevent the disturbance of the adjustment. The pin 16 projects radially from the quill outward through a slot 22 formed through the side wall of the nipple body in which the cavity 13 is formed.

The base of the valve seat 17 is fitted against a gasket 23 in a valve head 24, and the adjacent end of the quill 12 is fitted against a washer 25 in the base of the valve seat. The ports 26, therefore, leading through the valve seat to the blow-off valve are never in direct communication with the central bore 27 through the quill, valve seat, and head. The nipple body is seated in the head against a washer 28 and is locked in such position by means of a flanged thimble 29 having threaded engagement in the head at 30. Between the valve seat 17 and the portion of the head surrounding the gasket 23 is provided an annular chamber 31.

The head 24 has an extension 32 screw threaded into the side of a valve body 33 having a central cavity 34. The upper end of the body 33 is closed by means of a plug 35 screwed in at 36.

Opposite the plug 35 is a tubular shank 37 screw threaded at 38 into the body and having a check valve seat 39 formed at its upper end. A check valve 40 coöperates with the valve seat 39 and has a stem 41 projecting downward loosely through the bore 42 of the shank for coöperation with the tire valve mechanism for the unseating of the check valve 40 when the attachment is applied to the tire nipple 43. The head 24, body 33, and shank 37 are drilled at 44, straight through from the chamber 31 to the bore 42 bringing the blow-off valve into direct communication with the bore 42.

The lower end of the shank 37 is provided with an outwardly projecting flange 45 acting somewhat in the nature of a piston in a surrounding cylinder 46 whose upper end is spaced from the main portion of the shank, but provided with a flange 47 which projects inward into loose contact with the outer wall of the shank. In this space between the flanges 45 and 47 and surrounding the shank is a strong expansion spring 48, the normal tendency of which is to separate the two flanges or cause the cylinder to be forced upward toward the body 33. Fitted in the lower end of the cylinder is a rubber thimble 49, the same being held in place by means of a cap 50 fitted upon the lower end of the cylinder. This thimble 49 constitutes one of the principal features of an automatic clutch for holding the attachment directly upon the nipple 43. The thimble 49 by its resiliency tends to assume the form shown in Fig. 1 filling the space lengthwise between the cap 50 and the piston 45. The internal free diameter of the thimble in this form is large enough to just clear the threads on the nipple 43. When, however, the piston 45 is forced downward by any suitable means toward the cap 50 the thimble 49 is expanded toward the axis of the nipple 43 and so effectively grips upon said threads. (See Fig. 3.)

The best means of which I am aware at present for controlling this action of the clutch 49 is a lever or actuator 51 comprising a collar 52 surrounding the shank 37 and having an integral lever or finger piece 53. The cam collar 52 is provided with a plurality of lifts 54 shown as three in number adapted to coöperate directly with a like number of lugs or projections 55 carried by the lower portion of the body 33. These lugs 55 are equally spaced around the axis of the shank, and between the several lifts 54 are arranged a like number of depressions into which the lugs 55 project loosely when the lever 53 is turned through an angle of 60 degrees in the clutching position of the attachment. As will be noted in Fig. 3 a clearance 56 is observed for the purpose of insuring complete action of the spring 48 in the setting of the clutch thimble upon the nipple 43. When the device is to be attached to the nipple the operator turns the lever 53 into the position indicated in Figs. 1 and 4, thereby compressing the spring and relieving the tension on the rubber thimble. After the device is thus adjusted and slipped upon the nipple the operator turns the lever through a slight angle in either direction or as indicated in dotted lines in Fig. 4, corresponding to the position of Fig. 3, setting the spring free to effect the grip of the clutch thimble 49 upon the nipple.

Coincidentally with the application of the attachment to the nipple as just described the check valve 40 is unseated by the coöperation between the inner end of the stem 41 and the usual check valve stem 57. Hence the compressed air will thus be admitted directly through the ports 11 and 27 and pass the check valve 40 into the tire or other receiver. The port 27 is not so large but that all of the air passing therethrough will flow readily into the receiver until the desired pressure is reached in the tire or receiver. By virtue of the drill hole 44 the air in the device, the pressure of which is uniform throughout from the port 27 around to the annular chamber 31 will unseat the blow-off valve 15, the hissing of which will indicate to the operator that the desired pressure is reached in the tire. The device is then removed from the tire and immediately the check valve 40 will close under the pressure from the source of supply and no further leakage can take place therefrom. It will be understood that the pressure point at which the blow-off valve 15 becomes automatically effective will be determined by the rotation of the cam collar 19 around the nipple, this collar being graduated ordinarily from 50 to 90 pounds. The device thus far described is simple and certain in operation and not being likely to get out of order is well adapted for the rough usage to which it is likely to be subjected in every day practice.

By way of slight variation from that form of the device already described in detail in Fig. 4 I am able to make an attachment of such a nature as to be automatically blown off or disconnected from the tire nipple 43 at the moment the desired definite pressure in the tire is reached. As the body 33 is the same as above described having secured thereto the shank 37' around which is mounted a cam member 52 coöperating on one side with the lugs 55 and on the other side with a cylinder 46'. Within this cylinder is housed the fixed expansion spring 48 bearing at one end against the flange or piston 45' and at the other end against an adjustable flange or nut 47' having slidable engagement along the shank 37', but held from rotation thereon by means of a key 58 projecting into a groove 59. The upper end of the cylinder 46' is internally threaded for this nut 47', and on the outside of the cylinder is arranged a scale S having graduation marks to indicate the possible variations of pressure similar to those on the collar 19 above described and a pointer 60 on any relatively stationary member such as on the body 33 is adapted to indicate the pressure determined by the rotation of the cylinder around the shank and nut whereby the nut is run up or down along the screw threads varying the tension of the spring accordingly. The manner of applying the attachment to the nipple 43 is the same as has already been described, the clutch thimble 49' being adapted to automatically grip upon the threaded nipple by virtue of the spring 48 when the actuator 51 is turned to the position shown in Fig. 5. This spring 48 is so designed in connection with the piston-like action of the flange 45' that when the desired pressure is reached within the tire or container, the spring will be compressed allowing the thimble 49 to elongate and release its hold upon the nipple and then immediately the entire attachment is blown off automatically by the internal pressure.

In Figs. 5 and 6 I show a further modification in which the adjustable means consists of a collar 19 acting against the pin 16 associated with an elongated body 33' which partakes of some of the characteristics of the shank 37 in that its upper end constitutes the seat 39 for a check valve 40 having a stem 41 leading all the way down to the standard check valve stem 57 within the tire nipple 43. The lugs 55 are carried by the outwardly projecting flange 61 of the body 33' and they coöperate with an actuator 51' in the same manner as already described.

The main expansion spring 48 is housed within the cylinder 46 and operates as already described for the purpose of automatically compressing the clutch thimble 49ª. In this form, however, the thimble is surrounded by means of a metal thimble 49ᵇ having an inwardly projecting frusto-conical flange 49ᶜ having one or more notches 62 at its upper edge adjacent to the piston flange 45ª. 12' indicates a quill fitted at its upper end in the upper portion of the body 43' and constituting a guide for the pin 16 and the adjustable spring 14. The lower end of this spring bears in a metal ring 63 supported upon a flexible flanged washer 64 which seats directly upon the upper edge of the nipple 43 when the attachment is applied thereto as in Fig. 6. This washer 64 has air tight fit upon the lower end of the quill 12' and its outer flange bears against the bottom of the piston flange 45ª whereby premature leakage of air out through the body and slot 22 is prevented. Upon the adjustment of the collar 19 to control the pressure at which the device will blow off and the application of the attachment to the nipple as shown in Fig. 6, the standard check valve within the tire will be opened by the stem 41 and the air under pressure will be admitted in the tire until the degree of pressure is reached therein for which the device is set. At this moment the internal pressure will lift the washer 64 sufficiently to allow air to pass along the space between the washer and the metal thimble 49$^b$ filling the entire space beneath the piston flange 45$^a$. By reason, therefore, of the increased area of the surface upon which the pressure is caused to act the more powerful spring 48 will be compressed as shown in Fig. 7, and thus the compression of the thimble 49$^a$ is relieved and the device immediately blows off of the nipple. In these forms as well as that first described, the check valve 40 will immediately close and prevent loss of air through the tube nipple 10.

I claim:

1. In a combined blow-off hose connection for tires, a tubular member having an outwardly projecting piston flange, a cylinder embracing the flanged portion of the tubular member, an expansion spring surrounding the embraced portion of the tubular member and acting at one end against said piston flange and at its other end against a portion of the cylinder structure, a clutch thimble within the cylinder and adapted when compressed to grip upon a receiver nipple, and an actuator comprising a cam member journaled around the tubular member and serving to control the action of the spring upon the clutch thimble, substantially as set forth.

2. The herein described hose connection comprising a body including a tubular member projecting therefrom, a plurality of lugs carried by the body around the tubular member, a cylinder beyond the lugs, a clutch thimble within the cylinder, a spring acting between the tubular member and the cylinder to cause the clutch thimble to act automatically in one direction, and a cam actuator surrounding the tubular member and acting between said lugs and cylinder to cause the clutch thimble to operate in the other direction.

3. In a device of the character set forth, a tubular member, an outwardly projecting flange on the lower end thereof, a cylinder slidably embracing the flanged end of the tubular member and having a flange projecting inward, an expansion spring housed between the member and the cylinder and between said flanges and tending to telescope the member and cylinder, a flexible clutch thimble carried within the cylinder beyond the first mentioned flange and adapted to be compressed by the telescoping action aforesaid, and a finger piece acting between the tubular member and the cylinder serving to compress said spring and permit the extension of the clutch thimble, said finger piece comprising a cam collar mounted upon the tubular member and movable around the axis thereof.

4. In a device of the character described adapted to connect with a receiver to direct a fluid thereto under pressure, the combination of a nipple clutch having a flexible sleeve to effect the clutching action and means to automatically release the clutch to detach said device from the nipple at any predetermined pressure in the receiver.

5. In a device of the class described, a nipple clutch having a flexible sleeve constituting the clutching element, spring-pressed means normally tending to compress the clutch to effect the clutching engagement, and means to relieve the sleeve of the spring pressure to release the clutch.

6. A device of the class described adapted to connect with a receiver to direct a fluid thereto under pressure, the combination of clutch means adapted to effect clutching engagement with the inlet nipple of the receiver, and means to release said clutch and automatically detach said device from the nipple, said last-mentioned means being subject to a predetermined pressure developed in the receiver.

SAMUEL KAHN.